(12) United States Patent
Tsubouchi et al.

(10) Patent No.: US 11,421,937 B2
(45) Date of Patent: Aug. 23, 2022

(54) HEAT EXCHANGER COOLING SYSTEM

(71) Applicant: TOYOTA JIDOSHA KABUSHIKI KAISHA, Aichi-ken (JP)

(72) Inventors: Masakatsu Tsubouchi, Toyota (JP); Katsuya Komaki, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/872,384

(22) Filed: May 12, 2020

(65) Prior Publication Data

US 2021/0018269 A1    Jan. 21, 2021

(30) Foreign Application Priority Data

Jul. 17, 2019 (JP) .............................. JP2019-132162

(51) Int. Cl.
*F28F 25/02* (2006.01)
*F28F 25/06* (2006.01)
*F28F 27/00* (2006.01)
*F24F 1/42* (2011.01)
*F24F 11/83* (2018.01)
*F24F 11/84* (2018.01)
*F24F 11/85* (2018.01)
*F28C 3/06* (2006.01)
*F28D 3/04* (2006.01)
*H01M 8/04029* (2016.01)

(Continued)

(52) U.S. Cl.
CPC .......... *F28D 3/04* (2013.01); *H01M 8/04029* (2013.01); *H01M 8/04701* (2013.01); *B60K 11/04* (2013.01); *B60L 58/33* (2019.02); *H01M 2250/20* (2013.01)

(58) Field of Classification Search
USPC .............. 62/121, 171; 165/282; 137/565.11, 137/565.01
See application file for complete search history.

(56) References Cited

U.S. PATENT DOCUMENTS 3,265,122 A * 8/1966 Ostrander ............... F28F 25/02
                                                         165/60
3,911,060 A * 10/1975 Bradley, Jr. ............. B01D 1/30
                                                         261/27

(Continued)

FOREIGN PATENT DOCUMENTS

JP          2001357864 A       12/2001
JP           201943385 A        3/2019

*Primary Examiner* — Frantz F Jules
*Assistant Examiner* — Jason N Thompson
(74) *Attorney, Agent, or Firm* — Hauptman Ham, LLP

(57) ABSTRACT

A heat exchanger cooling system includes: a passage extending from a water tank and branching off into a first passage and a second passage at a branch portion provided in the middle of extension of the passage, the passage including a water discharge portion provided on a distal end side of the first passage so as to face a radiator; a pump configured to send water into the passage from the water tank; a first opening-closing valve provided in the first passage and configured to open and close the first passage; a second opening-closing valve provided in the second passage and configured to open and close the second passage; and a controlling portion configured to control an operation of the pump and to control opening and closing of the first opening-closing valve and the second opening-closing valve.

18 Claims, 7 Drawing Sheets

(51) Int. Cl.
*H01M 8/04701* (2016.01)
*B60L 58/33* (2019.01)
*B60K 11/04* (2006.01)

(56) References Cited

U.S. PATENT DOCUMENTS

| | | | | |
|---|---|---|---|---|
| 4,121,541 A | * | 10/1978 | Kneissl | B01D 47/00 122/1 R |
| 4,389,352 A | * | 6/1983 | Bohanon, Sr. | F24F 6/04 261/106 |
| 4,475,356 A | * | 10/1984 | Lewis | F28F 25/00 62/183 |
| 4,970,876 A | * | 11/1990 | Vinokurov | B60H 1/3202 62/304 |
| 5,148,859 A | * | 9/1992 | Beamer | B60H 1/3202 123/41.01 |
| 5,444,991 A | * | 8/1995 | Cox | F28D 5/00 62/305 |
| 5,884,492 A | * | 3/1999 | Zwicky | F24F 11/0008 261/129 |
| 6,047,555 A | * | 4/2000 | Weng | F24F 11/30 62/171 |
| 7,308,801 B1 | * | 12/2007 | Tilton | G01R 31/2874 257/E23.1 |
| 8,781,701 B2 | * | 7/2014 | Aoki | B60T 8/4872 701/70 |
| 2003/0019219 A1 | * | 1/2003 | Viegas | G05D 23/1931 62/50.2 |
| 2006/0162349 A1 | * | 7/2006 | Edwards | F24F 5/0035 62/121 |
| 2008/0103009 A1 | * | 5/2008 | Park | F16D 25/0638 475/231 |
| 2011/0132030 A1 | * | 6/2011 | Kim | F25B 5/04 62/507 |
| 2016/0069577 A1 | * | 3/2016 | Dinnage | F28F 19/00 62/121 |
| 2016/0159202 A1 | * | 6/2016 | Harms | F24F 6/04 261/29 |
| 2017/0219227 A1 | * | 8/2017 | Bujsaim | F24F 13/30 |

* cited by examiner

HEAT EXCHANGER COOLING SYSTEM

INCORPORATION BY REFERENCE

The disclosure of Japanese Patent Application No. 2019-132162 filed on Jul. 17, 2019 including the specification, drawings and abstract is incorporated herein by reference in its entirety.

BACKGROUND

1. Technical Field

The present disclosure relates to a heat exchanger cooling system for cooling a heat exchanger such as a radiator of a vehicle.

2. Description of Related Art

Japanese Unexamined Patent Application Publication No. 2001-357864 (JP 2001-357864 A) discloses a technology for a fuel cell system as follows. That is, water with a particle diameter of 50 μm or more is jetted out to an outer surface of a radiator for cooling refrigerant of a fuel cell, so that cooling performance of the radiator is improved by evaporative latent heat of the water. In this fuel cell system, steam generated inside the fuel cell and a slight amount of hydrogen and carbon dioxide are led to a catalyzer and burn, and the fuel gas is led to a condenser (a water collection device) by passing through a steam generator. Water collected herein is jetted to the radiator from an injection hole of a header via a control valve. At this time, the control valve performs an ON-OFF control by a control device or a flow control by a throttle valve.

SUMMARY

In the above technology in the related art, a water jet amount is adjusted by controlling pressure loss of water flowing through a passage by opening and closing of the control valve or adjustment of an opening degree of the control valve. On this account, internal pressure in the passage might greatly change to cause cavitation, and the water jet amount (discharge amount) might become unstable due to air bubbles generated in the passage.

The present disclosure is achieved in consideration of the above fact, and an object of the present disclosure is to provide a heat exchanger cooling system which has a configuration in which a discharge amount of liquid to be discharged toward a heat exchanger is adjustable and which can restrain occurrence of cavitation in a passage where the liquid flows.

A heat exchanger cooling system according to the disclosure of a first aspect includes a heat exchanger, a storage tank, a passage, a pump, a first opening-closing valve, a second opening-closing valve, and a controlling portion. The heat exchanger is configured to dissipate heat of refrigerant. In the storage tank, liquid is stored. The passage extends from the storage tank and branches off into a first passage and a second passage at a branch portion provided in the middle of extension of the passage. The passage includes a liquid discharge portion provided on a distal end side of the first passage so as to face the heat exchanger. The pump is configured to send the liquid into the passage from the storage tank. The first opening-closing valve is provided in the first passage and configured to open and close the first passage. The second opening-closing valve is provided in the second passage and configured to open and close the second passage. The controlling portion is configured to control an operation of the pump and control opening and closing of the first opening-closing valve and the second opening-closing valve.

In the disclosure according to the first aspect, when the controlling portion activates the pump, the liquid (e.g., water) stored in the storage tank is sent into the passage from the storage tank by the pump. The passage extends from the storage tank and branches off into the first passage and the second passage at the branch portion provided in the middle of extension of the passage. The liquid discharge portion placed to face the heat exchanger is provided on the distal end side of the first passage. Further, the first passage is provided with the first opening-closing valve, and the second passage is provided with the second opening-closing valve. The opening and closing of the first opening-closing valve and the second opening-closing valve is controlled by the controlling portion.

Here, in a state where the first opening-closing valve is opened and the second opening-closing valve is closed, the liquid flows through the first passage and is discharged toward the heat exchanger from the liquid discharge portion. This allows the liquid to be attached to an outer surface of the heat exchanger. As a result, the heat dissipation ability of the heat exchanger can be improved by evaporative latent heat of the liquid, for example. Further, in a state where the first opening-closing valve and the second opening-closing valve are both opened, the liquid also flows into the second passage. Accordingly, a flow rate of the liquid flowing into the first passage, that is, a discharge amount of the liquid discharged from the liquid discharge portion is reduced. Thus, in the present disclosure, the discharge amount of the liquid discharged toward the heat exchanger is adjustable.

Besides, even in a case where the discharge amount of the liquid is reduced as described above, the flow of the liquid into the second passage is allowed because the second opening-closing valve is opened, thereby making it possible to restrain internal pressure in the passage from greatly fluctuating. This makes it possible to restrain occurrence of cavitation inside the passage.

A heat exchanger cooling system according to the disclosure of a second aspect is as follows: in the first aspect, the second passage may be routed so that the liquid flowing into the second passage is circulated back into the storage tank.

In the disclosure according to the second aspect, the liquid flowing into the second passage is circulated back to the storage tank. Accordingly, in comparison with a case where the liquid flowing into the second passage is discarded, the liquid can be used effectively. As a result, it is possible to downsize the storage tank and to reduce a cost. Further, in a case where the system is provided in a vehicle, for example, the mountability of the storage tank in the vehicle improves due to the downsizing of the storage tank.

A heat exchanger cooling system according to the disclosure of a third aspect is as follows: in the first or second aspect, the branch portion may be placed above the liquid discharge portion in a vertical direction, and the second passage may extend upward from the branch portion in the vertical direction.

In the disclosure according to the third aspect, the branch portion of the passage is placed above the liquid discharge portion in the vertical direction, the liquid discharge portion being provided on the distal end side of the first passage, and the second passage extends upward from the branch portion in the vertical direction. Hereby, even if cavitation occurs in the passage and air bubbles are generated, the air bubbles easily flow into the second passage. Accordingly, it is possible to prevent or restrain the discharge amount of the liquid from the liquid discharge portion in the first passage from becoming unstable due to the air bubbles.

A heat exchanger cooling system according to the disclosure of a fourth aspect is as follows: in any of the first to third aspects, the controlling portion may activate the pump in a state where the first opening-closing valve is closed and the second opening-closing valve is opened, and after that, the controlling portion may open the first opening-closing valve.

In the disclosure according to the fourth aspect, the pump is activated in a state where the first opening-closing valve is closed and the second opening-closing valve is opened. This consequently causes a state where the liquid sent into the passage from the storage tank flows into the second passage while the liquid reaches the first opening-closing valve in the first passage. Hereby, when the first opening-closing valve is opened after that, the liquid can be discharged immediately from the liquid discharge portion in the first passage.

A heat exchanger cooling system according to the disclosure of a fifth aspect is as follows: in any of the first to fourth aspects, when the controlling portion stops the pump, the controlling portion may close the first opening-closing valve and the second opening-closing valve.

In the disclosure according to the fifth aspect, when the pump is stopped, the first opening-closing valve and the second opening-closing valve are closed. This makes it possible to restrain counterflow of the liquid from the passage into the storage tank. As a result, regardless of the height of a liquid surface in the storage tank, the height of a liquid surface in the passage can be easily kept uniform.

A heat exchanger cooling system according to the disclosure of a sixth aspect is as follows: in the fifth aspect, when the controlling portion stops the pump, the controlling portion may close the first opening-closing valve prior to the second opening-closing valve.

In the disclosure according to the sixth aspect, when the pump is stopped, the first opening-closing valve is closed in prior to the second opening-closing valve. Even in a state where the first opening-closing vale is closed, if the second opening-closing valve is opened, the flow of the liquid into the second passage is allowed. This makes it possible to prevent or restrain a load from being applied to the first opening-closing valve due to an increase in internal pressure of the passage.

A heat exchanger cooling system according to the disclosure of a seventh aspect is as follows: in any of the first to sixth aspects, the heat exchanger cooling system may include a temperature sensor configured to detect a temperature of the refrigerant, and the controlling portion may control the operation of the pump and the opening and closing of the first opening-closing valve and the second opening-closing valve based on the detection result from the temperature sensor.

In the disclosure according to the seventh aspect, the controlling portion controls the operation of the pump and the opening and closing of the first opening-closing valve and the second opening-closing valve based on the detection result from the temperature sensor configured to detect the temperature of the refrigerant. Hereby, the discharge amount of the liquid discharged toward the heat exchanger is adjustable in accordance with the temperature of the refrigerant. This makes it possible to adjust the heat dissipation ability of the heat exchanger in accordance with the temperature of the refrigerant.

As described above, the heat exchanger cooling system according to the present disclosure has a configuration in which a discharge amount of liquid to be discharged toward a heat exchanger is adjustable, and the heat exchanger cooling system can restrain occurrence of cavitation in a passage where the liquid flows.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
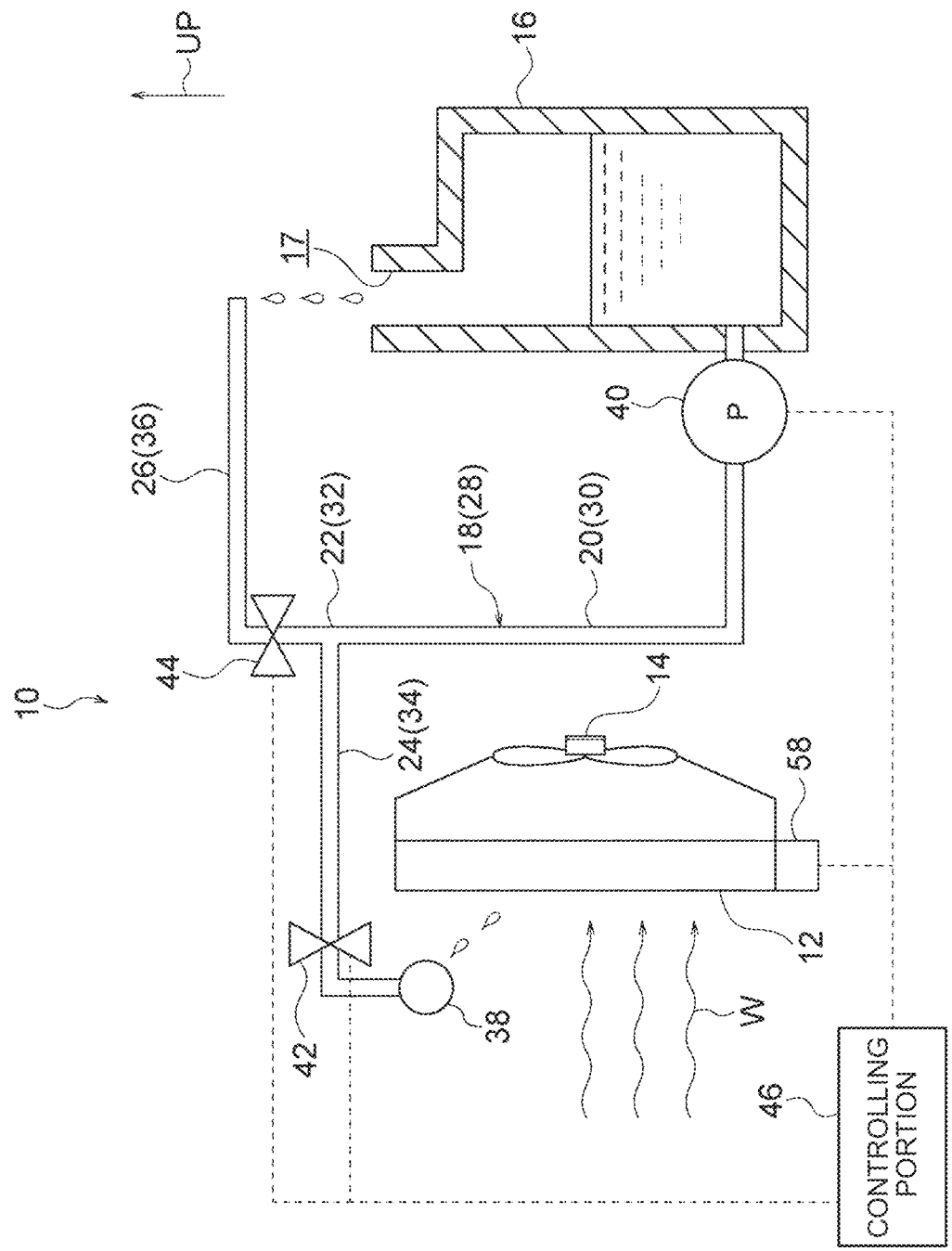
FIG. 1 is a configuration diagram illustrating a heat exchanger cooling system according to an embodiment of the present disclosure.
Figure 2:
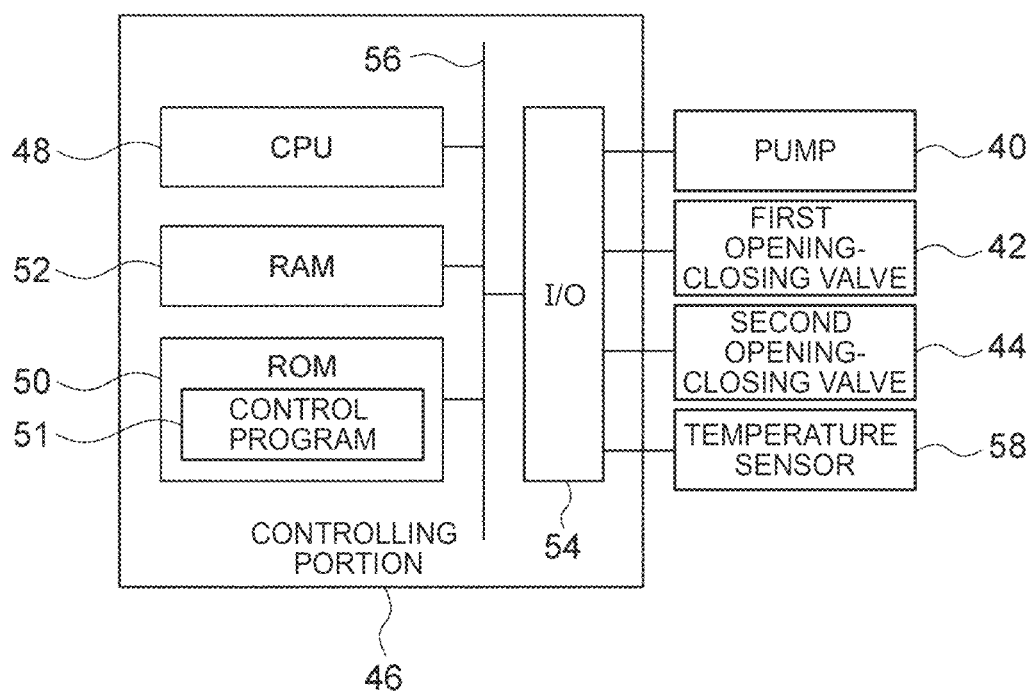
FIG. 2 is a block diagram illustrating a control system of the heat exchanger cooling system.
Figure 3:
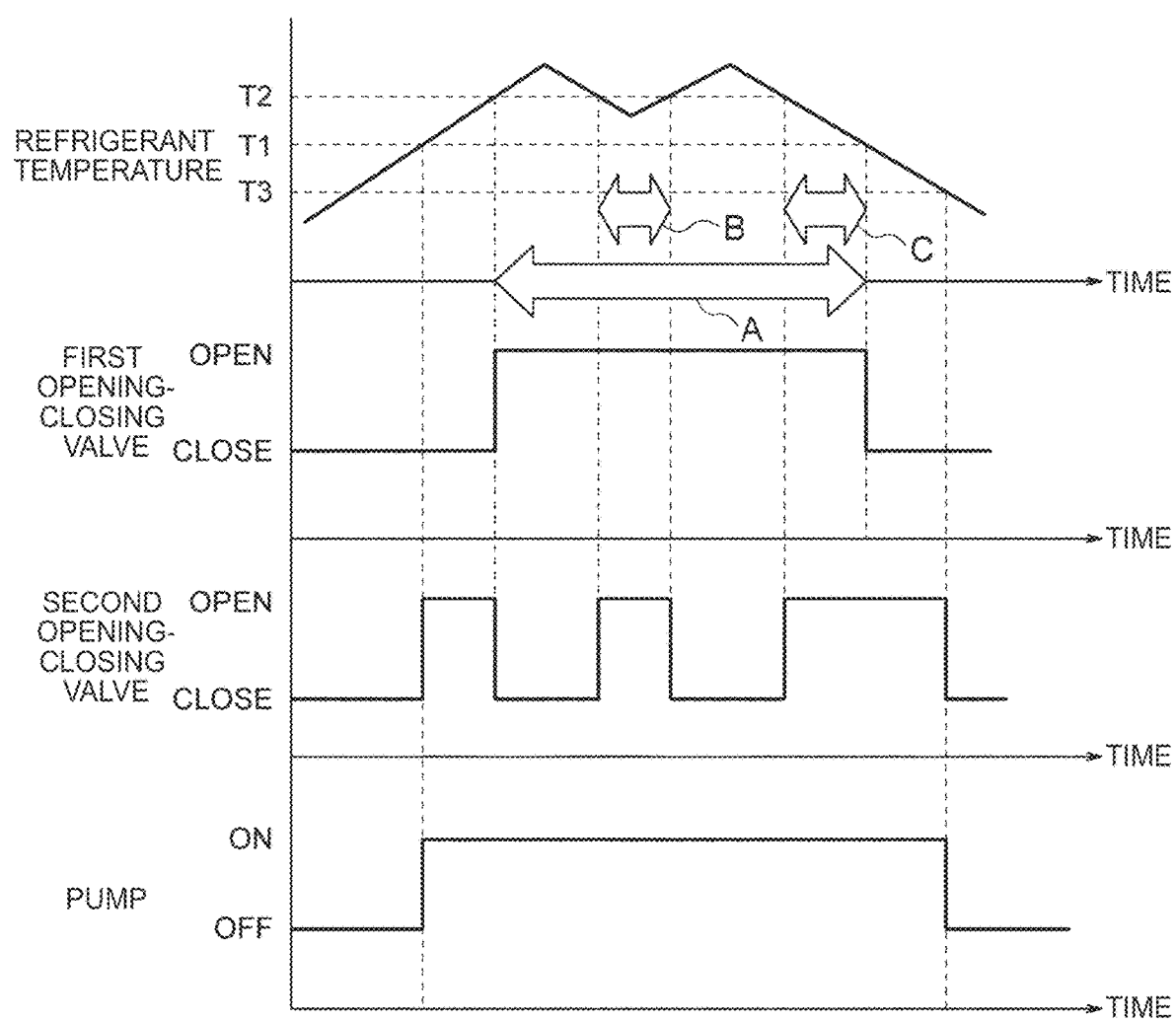
FIG. 3 is a timing chart illustrating one example of an operation timing of a pump and opening and closing timings of opening-closing valves by a controlling portion.

The following describes a heat exchanger cooling system 10 according to an embodiment of the present disclosure with reference to FIGS. 1 to 3. Note that an arrow UP described appropriately in the figures indicates an upper side of a vehicle (not shown) provided with the heat exchanger cooling system 10.

Configuration

As illustrated in FIG. 1, the heat exchanger cooling system 10 according to the present embodiment includes a radiator 12 as a heat exchanger configured to dissipate heat of refrigerant, a water tank 16 as a storage tank in which liquid (herein, water) is stored, and a hose (pipe) 18 extended from the water tank 16. The hose 18 forms a passage 28 through which the water flows, and the hose 18 branches off into a first hose portion 24 and a second hose portion 26 at a branch hose portion 22 provided in the middle of extension of the hose 18. The first hose portion 24 forms a first passage 34, the second hose portion 26 forms a second passage 36, and the branch hose portion 22 forms a branch portion (a branch passage) 32. A water discharge portion (a water outlet port) 38 as a liquid discharge portion (a liquid outlet port) is provided in a distal end portion of the first hose portion 24.

Further, the heat exchanger cooling system 10 includes: a pump 40 configured to send the water into the hose 18 from the water tank 16; a first opening-closing valve 42 provided in the first hose portion 24 (the first passage 34) and configured to open and close the first passage 34; a second opening-closing valve 44 provided in the second hose portion 26 (the second passage 36) and configured to open and close the second passage 36; a controlling portion 46 configured to control an operation of the pump 40 and to control opening and closing of the first opening-closing valve 42 and the second opening-closing valve 44; and a temperature sensor 58 configured to detect a temperature of the refrigerant.

The radiator 12 is a heat exchanger for cooling the refrigerant (herein, cooling water) of a fuel cell in a fuel cell system for a vehicle, for example, and includes a core constituted by a plurality of tubes and fins. The refrigerant circulates through each of the tubes, and cooler wind (travel wind of the vehicle and air blow from a radiator fan 14) W hits an outer surface of the core. Hereby, heat of the refrigerant is dissipated from the outer surface of the core. Note that the radiator 12 may be a radiator for cooling an internal combustion engine such as a gasoline engine, a radiator for cooling a battery or the like of an electric vehicle, or a radiator for cooling a fuel cell in a fuel cell system for household use.

The water tank 16 has a hollow rectangular-solid shape, for example, and water is poured into the water tank 16 from an inlet 17 formed in an upper end portion of the water tank 16. As the water, discharge water from a fuel cell system can be used, for example. Note that "liquid" in the present disclosure may be cooling fluid (coolant, antifreeze solution, or the like) other than water. However, it is preferable that the liquid have an evaporating temperature equivalent to that of water.

The hose (liquid water tube) 18 is made of rubber, resin, or metal in an elongated tube shape, for example, and branches off into two in an intermediate part in the longitudinal direction. The hose 18 is constituted by a base-end side hose portion 20 extending from around a lower end portion of the water tank 16, the branch hose portion 22 provided in a distal end portion of the base-end side hose portion 20, and the first hose portion 24 and the second hose portion 26 branched at the branch hose portion 22. The base-end side hose portion 20 forms a base-end side passage 30.

The water discharge portion 38 is provided in the distal end portion of the first hose portion 24. The water discharge portion 38 is placed below the branch hose portion 22 (the branch portion 32) in the vertical direction (herein, the vehicle up-down direction) and is placed so as to face the radiator 12. Hereby, water flowing into the first hose portion 24 from the branch hose portion 22 side is discharged (jetted) toward the radiator 12 from the water discharge portion 38. Note that it is preferable that the first hose portion 24 be routed so as not to project upward from the branch hose portion 22. Further, in the present embodiment, the water discharge portion 38 faces the radiator 12 in the horizontal direction, but the present embodiment is not limited to this. For example, the water discharge portion 38 may be configured to face the radiator 12 from above.

The second hose portion 26 extends upward in the vertical direction from the branch portion 32 and turns in the horizontal direction to extend toward the water tank 16 side. The second hose portion 26 is routed above the first hose portion 24 in the vertical direction. A distal end portion (a distal opening) of the second hose portion 26 is placed above the inlet 17 of the water tank 16 in the vertical direction and is opened to an atmosphere. Hereby, the water flowing into the second hose portion 26 from the branch portion 32 side is circulated back into the water tank 16 from the distal end portion of the second hose portion 26. That is, the second passage 36 constituted by the second hose portion 26 is routed so that the water flowing into the second passage 36 is circulated back into the water tank 16.

The pump 40 is a liquid pump and is placed in a lower end portion of the water tank 16 herein. A suction opening (not shown) of the pump 40 is connected to the lower end portion of the water tank 16, and a discharge opening (not shown) is connected to a base end portion of the base-end side hose portion 20 of the hose 18. That is, in the present embodiment, the hose 18 extends from the lower end portion of the water tank 16 via the pump 40. When the pump 40 operates, the water in the water tank 16 is sent into the hose 18. Note that the pump 40 may be provided in the intermediate part of the base-end side hose portion 20 in the longitudinal direction. In this case, the base end portion of the base-end side hose portion 20 is directly connected to the lower end portion of the water tank 16.

The first opening-closing valve 42 is attached to a distal end side (near the water discharge portion 38) of the first hose portion 24 so that the first passage 34 is openable and closable by the first opening-closing valve 42. The second opening-closing valve 44 is attached to a base end side (near the branch portion 32) of the second hose portion 26 so that the second passage 36 is openable and closable by the second opening-closing valve 44. The first opening-closing valve 42 and the second opening-closing valve 44 are normally-closed type electromagnetic valves, for example. Note that, in the present embodiment, the first opening-closing valve 42 and the second opening-closing valve 44 are so-called ON-OFF valves that can take only two states of a fully opened state and a fully closed state. However, the present embodiment is not limited to this. At least one of the first opening-closing valve 42 and the second opening-closing valve 44 may be configured such that its opening degree is adjustable.

As illustrated in FIG. 2, the controlling portion 46 includes a central processing unit (CPU; processor) 48, a read only memory (ROM) 50, a random access memory (RAM) 52, and an input-output interface portion (I/O) 54 configured to communicate with an external device. These constituents are connected to each other via a bus 56 in a mutually communicable manner. The input-output interface 54 is electrically connected to the pump 40, the first opening-closing valve 42, the second opening-closing valve 44, and the temperature sensor 58. The CPU 48 is a central processing unit and is configured to execute various programs and control each portion. That is, the CPU 48 reads a control program 51 from the ROM 50 and executes the control program 51 in the RAM 52 as a working area. The temperature sensor 58 is provided near an inlet for the refrigerant in the radiator 12, for example, and is configured to detect a temperature (hereinafter referred to as a "refrigerant temperature") of the refrigerant flowing into the radiator 12 and output a detection result to the CPU 48. The CPU 48 is configured to perform a control on each constituent and various computing processes in accordance with the control program 51 stored in the ROM 50. The controlling portion 46 controls an operation of the pump 40 and opening and closing of each of the opening-closing valves 42, 44 based on the refrigerant temperature.

The following describes one example of an operation timing of the pump 40 and opening and closing timings of the opening-closing valves 42, 44 by the controlling portion 46 based on the timing chart illustrated in FIG. 3. Note that an arrow A illustrated in FIG. 3 indicates a time when water is discharged (jetted) from the water discharge portion 38, and arrows B, C each indicate a time when a discharge amount of water from the water discharge portion 38 is adjusted (reduced).

When the fuel cell system is activated, a refrigerant temperature detected by the temperature sensor starts to rise. The controlling portion 46 keeps the pump 40 in a stop state and keeps the opening-closing valves 42, 44 in a closed state until the refrigerant temperature reaches a first preset temperature T1 (e.g., 95° C.). When the refrigerant temperature reaches the first preset temperature T1, the controlling portion 46 activates the pump 40 and opens the second opening-closing valve 44. That is, the controlling portion 46 activates the pump 40 in a state where the first opening-closing valve 42 is closed and the second opening-closing valve is opened. This causes a state where the water sent into the passage 28 from the water tank 16 is circulated back to the water tank 16 through the second passage 36, and the water reaches the first opening-closing valve 42 in the first passage 34.

After that, when the refrigerant temperature reaches a second preset temperature T2 (e.g., 100° C.), the controlling portion 46 opens the first opening-closing valve 42 and closes the second opening-closing valve 44. Hereby, the flow of the water into the second passage 36 is restrained, and the water flowing into the first passage 34 is discharged toward the radiator 12 from the water discharge portion 38. The water thus discharged is attached on a surface of the radiator 12 so that the water vaporizes, and the heat dissipation ability of the radiator 12 improves by evaporative latent heat of the water.

As a result, the refrigerant temperature thus rising to the second preset temperature T2 or more decreases to the second preset temperature T2, so that the controlling portion 46 opens the second opening-closing valve 44 again. Hereby, the water sent into the passage 28 from the water tank 16 is partially circulated back to the water tank 16 through the second passage 36, so that a discharge amount of the water from the water discharge portion 38 in the first passage 34 is reduced. As a result, the refrigerant temperature thus decreasing to the second preset temperature T2 or less rises to the second preset temperature T2 again, so that the controlling portion 46 closes the second opening-closing valve 44. Hereby, the flow of the water into the second passage 36 is restrained again, so that the discharge amount of the water from the water discharge portion 38 in the first passage 34 increases. As a result, the refrigerant temperature thus rising to the second preset temperature T2 or more decreases to the second preset temperature T2 again, so that the controlling portion 46 opens the second opening-closing valve 44 again. Hereby, the discharge amount of the water from the water discharge portion 38 is reduced again. Thus, the controlling portion 46 controls (adjusts) the discharge amount of the water from the water discharge portion 38 by intermittently opening and closing the second opening-closing valve 44 based on the refrigerant temperature. Note that, when the opening degree of at least one of the opening-closing valves 42, 44 is adjustable, the discharge amount can be controlled more finely.

Then, when the fuel cell system is stopped and the refrigerant temperature decreases, the controlling portion 46 stops the pump 40 and closes the opening-closing valves 42, 44. At this time, the controlling portion 46 is configured to close the first opening-closing valve 42 prior to the second opening-closing valve 44. More specifically, the controlling portion 46 closes the first opening-closing valve 42 when the refrigerant temperature decreases to the first preset temperature T1 due to the stop of the fuel cell system. At this time, the controlling portion 46 keeps the pump 40 activated and keeps the second opening-closing valve 44 opened. Hereby, the water sent into the passage 28 from the water tank 16 is circulated back to the water tank 16 through the second passage 36, and discharge of the water from the water discharge portion 38 is stopped. After that, when the refrigerant temperature decreases to a third preset temperature T3 (e.g., 90° C.), the controlling portion 46 stops the pump 40 and closes the second opening-closing valve 44. Note that it is preferable that the controlling portion 46 close the second opening-closing valve 44 at the same timing that the pump 40 is stopped, but there may be some time lags.

Operations and Effects

The following describes operations and effects of the present embodiment.

In the heat exchanger cooling system 10 configured as such, when the controlling portion 46 activates the pump 40, water stored in the water tank 16 is sent into the passage 28 from the water tank 16 by the pump 40. The passage 28 extends from the water tank 16 and branches off into the first passage 34 and the second passage 36 at the branch portion 32 provided in the middle of extension of the passage 28. The water discharge portion 38 placed to face the radiator 12 is provided in the distal end portion of the first passage 34. Further, the first passage 34 is provided with the first opening-closing valve 42, and the second passage 36 is provided with the second opening-closing valve 44. The opening and closing of the first opening-closing valve 42 and the second opening-closing valve 44 is controlled by the controlling portion 46.

Here, in a state where the first opening-closing valve 42 is opened and the second opening-closing valve 44 is closed, the water flows through the first passage 34 and is discharged toward the radiator 12 from the water discharge portion 38. The water thus discharged is attached on the surface of the radiator 12 so that the water vaporizes, thereby resulting in that the heat dissipation ability of the radiator 12 improves by evaporative latent heat of the water. Further, in a state where the first opening-closing valve 42 and the second opening-closing valve 44 are both opened, the water also flows into the second passage 36. Accordingly, a flow rate of the water flowing into the first passage 34, that is, a discharge amount of the water discharged from the water discharge portion 38 is reduced. On this account, when the second opening-closing valve 44 is repeatedly opened and closed intermittently in a state where the first opening-closing valve 42 is opened, for example, the discharge amount of the water discharged from the water discharge portion 38 is intermittently increased and reduced. Further, when the first opening-closing valve 42 is repeatedly opened and closed intermittently in a state where the second opening-closing valve 44 is opened, for example, the water is intermittently discharged from the water discharge portion 38 in the first passage 34. Thus, in the present embodiment, the discharge amount of the water discharged toward the radiator 12 is adjustable.

Besides, even in a case where the discharge amount of the water is reduced or the water is intermittently discharged as described above, the flow of the water into the second passage 36 is allowed because the second opening-closing valve 44 is opened. This makes it possible to minimize the fluctuation in internal pressure of the passage 28. This makes it possible to restrain occurrence of cavitation in the passage 28.

Figure 4:
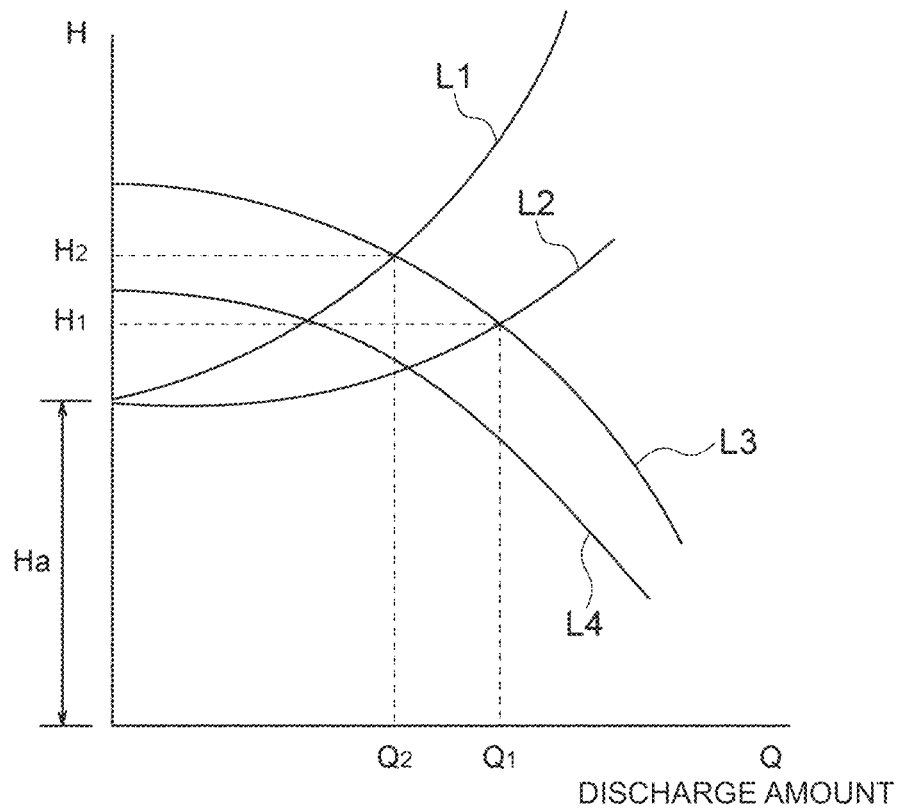
FIG. 4 is a chart illustrating a relationship between a discharge amount of the pump and a pump head.

That is, like the technology described in the related art, in the configuration where the discharge amount of water (the water jet amount) is adjusted by controlling pressure loss of the water flowing through the passage by opening and closing the control valve or by adjusting an opening degree of the control valve, pressure inside the passage greatly fluctuates (e.g., the pressure greatly changes between $H_1$ and $H_2$ in FIG. 4). As a result, this might cause cavitation, so that the discharge amount might become unstable due to air bubbles generated in the passage. However, the present embodiment can avoid this problem. Note that FIG. 4 is a chart illustrating a relationship between the discharge amount from the pump and a pump head (pressure). In FIG. 4, L1 is a head loss curve in a state where the control valve is throttled, L2 is a head loss curve in a state where the control valve is opened, L3 is a pump performance curve when the rotation number of the pump is high, and L4 is a pump performance curve when the rotation number of the pump is low.

Further, the control on the water jet amount (the discharge amount) also includes a method for controlling the rotation number of the pump. With this method, it is possible to prevent the occurrence of cavitation, but the method requires a control device such as an inverter. This causes an increase in cost for the system. In this respect, in the present embodiment, such a control device is not required, and therefore, it is possible to achieve a reduction in cost for the system.

Besides, in the present embodiment, the second passage 36 (the second hose portion 26) is routed so that the water flowing into the second passage 36 is circulated back to the water tank 16. Hereby, the water can be used effectively in comparison with a case where the water flowing into the second passage 36 is discarded (e.g., the water is discharged to a road). As a result, it is possible to downsize the water tank 16 and to reduce a cost. Further, by downsizing the water tank 16, the mountability of the water tank 16 in a vehicle improves.

Further, in the present embodiment, the branch portion 32 of the passage 28 is placed above the water discharge portion 38 in the vertical direction, the water discharge portion 38 being provided in the distal end portion of the first passage 34, and the second passage 36 extends upward from the branch portion 32 in the vertical direction. Hereby, even if cavitation occurs in the passage 28 and air bubbles are generated, the air bubbles easily flow into the second passage 36. Accordingly, it is possible to prevent or restrain the discharge amount of the water from the water discharge portion 38 in the first passage 34 from becoming unstable due to the air bubbles.

Further, in the present embodiment, the controlling portion 46 activates the pump 40 in a state where the first opening-closing valve 42 is closed and the second opening-closing valve 44 is opened. This consequently causes a state where the water sent into the passage 28 from the water tank 16 flows into the second passage 36 while the water reaches the first opening-closing valve 42 in the first passage 34. Hereby, when the first opening-closing valve 42 is opened after that, the water can be discharged immediately from the water discharge portion 38 in the first passage 34.

Further, in the present embodiment, when the controlling portion 46 stops the pump 40, the controlling portion 46 closes the first opening-closing valve 42 and the second opening-closing valve 44. This makes it possible to restrain counterflow of the water from the passage 28 into the water tank 16. As a result, regardless of the height of a water surface (liquid surface) in the water tank 16, the height of a water surface (liquid surface) in the passage 28 can be easily kept uniform. As a result, when the pump 40 is activated next time, the time required before the water reaches the water discharge portion 38 can be shortened.

Figure 5A:
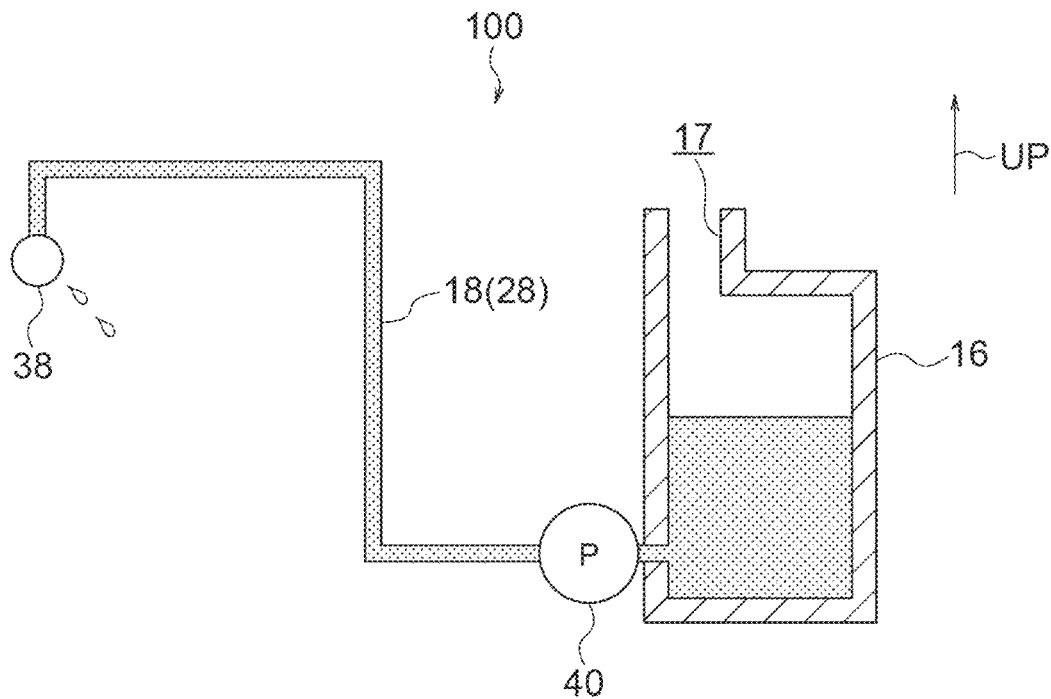
FIG. 5A is a configuration diagram illustrating a heat exchanger cooling system according to a comparative example and a view illustrating a state during operation of a pump.
Figure 5B:
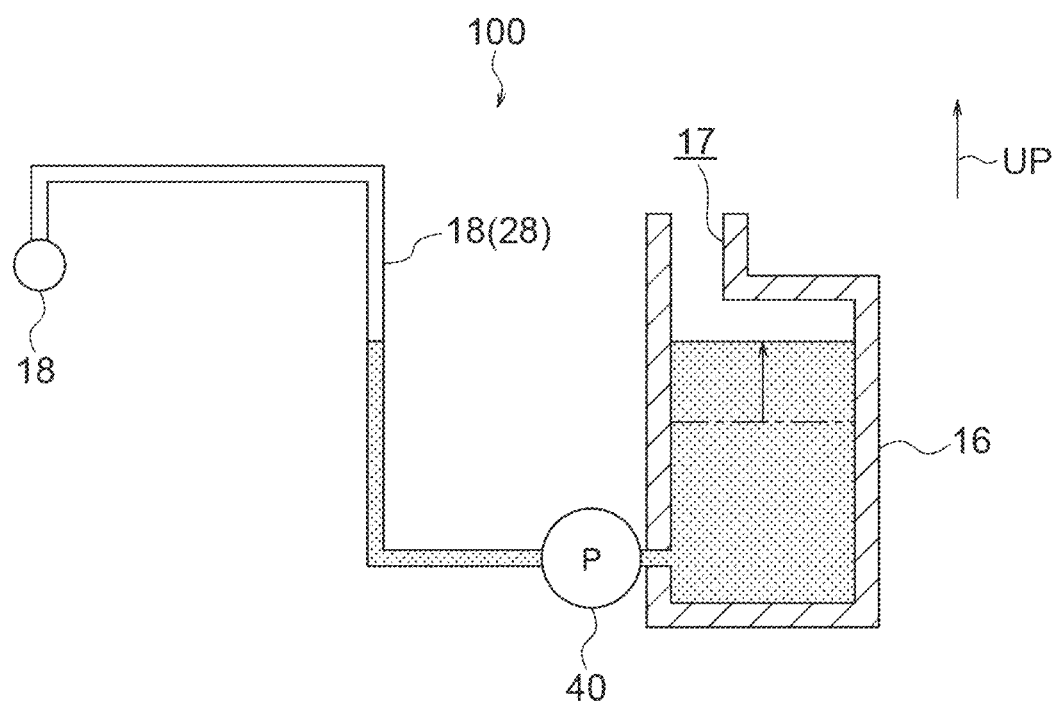
FIG. 5B is a configuration diagram illustrating the heat exchanger cooling system according to the comparative example and a view illustrating a state during stop of the pump.

That is, like a comparative example 100 illustrated in FIGS. 5A and 5B, in a configuration where the hose 18 (the passage 28) connecting the water tank 16 to the water discharge portion 38 extends above a water surface of water in the water tank 16 and no opening-closing valve is provided in the hose 18, water in the hose 18 (the passage 28) flows backward and returns into the water tank 16 at the time when the pump 40 is stopped. In this case, the water in the hose 18 flows backward until the height of a water surface in the hose 18 becomes equal to that of the water in the water tank 16. On this account, when the pump 40 is activated next time, a delay occurs in the time required before the water reaches the water discharge portion 38. However, the present embodiment can avoid this problem. This effect can be obtained regardless of shapes and arrangement of the water tank 16 and the hose 18, and therefore, the degree of freedom in shapes and arrangement of the water tank 16 and the hose 18 increases. Note that, in FIGS. 5A and 5B, a part corresponding to the water is illustrated in dots for convenience of description.

Further, in the present embodiment, when the controlling portion 46 stops the pump 40, the controlling portion 46 closes the first opening-closing valve 42 prior to the second opening-closing valve 44. Even in a state where the first opening-closing valve 42 is closed, if the second opening-closing valve 44 is opened, the flow of the water into the second passage 36 is allowed. This makes it possible to prevent or restrain a load from being applied to the first opening-closing valve 42 due to an increase in internal pressure of the passage 28.

Further, in the present embodiment, the controlling portion 46 controls the operation of the pump 40 and the opening and closing of the opening-closing valves 42, 44 based on a detection result from the temperature sensor 58 configured to detect a refrigerant temperature. Hereby, the discharge amount of the water discharged toward the radiator 12 is adjustable in accordance with the refrigerant temperature. This makes it possible to adjust (stabilize) the heat dissipation ability of the radiator 12 in accordance with the refrigerant temperature.

Modifications

Next will be described modifications of the embodiment of the present disclosure with reference to FIGS. 6 and 7. Note that, in FIGS. 6 and 7, the same reference sign is given to the same constituent as the above embodiment.

Figure 6:
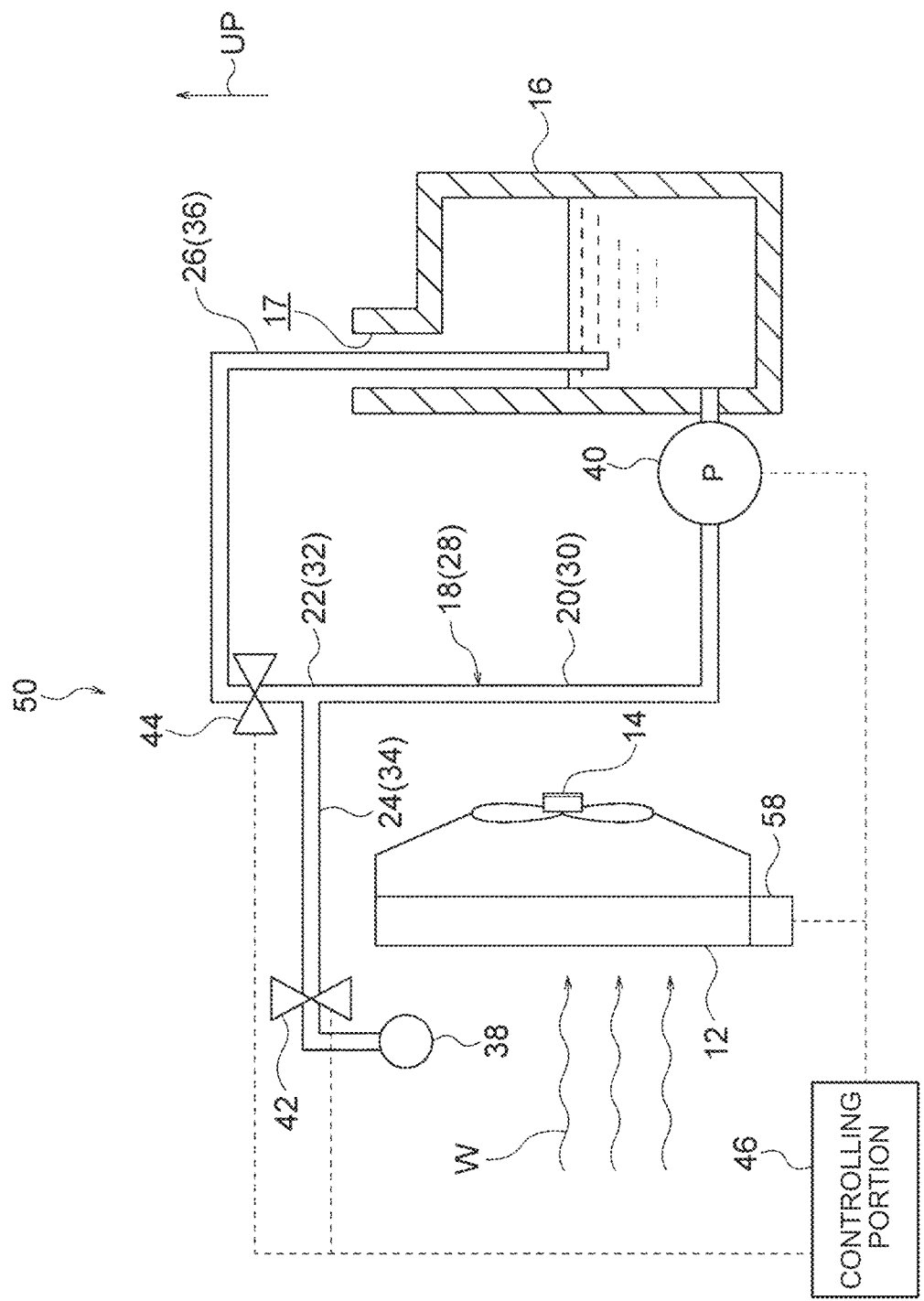
FIG. 6 is a configuration diagram illustrating a first modification of the heat exchanger cooling system according to the embodiment of the present disclosure.

In a first modification 50 illustrated in FIG. 6, a distal end side of the second hose portion 26 (the second passage 36) is inserted into the water tank 16 from the inlet 17 of the water tank 16, so that the distal end portion of the second hose portion 26 is placed around a central part inside the water tank 16 in the up-down direction. Even in the first modification 50, the water flowing into the second passage 36 can be circulated back to the water tank 16. Thus, it is possible to obtain an effect basically the same as that of the above embodiment.

Figure 7:
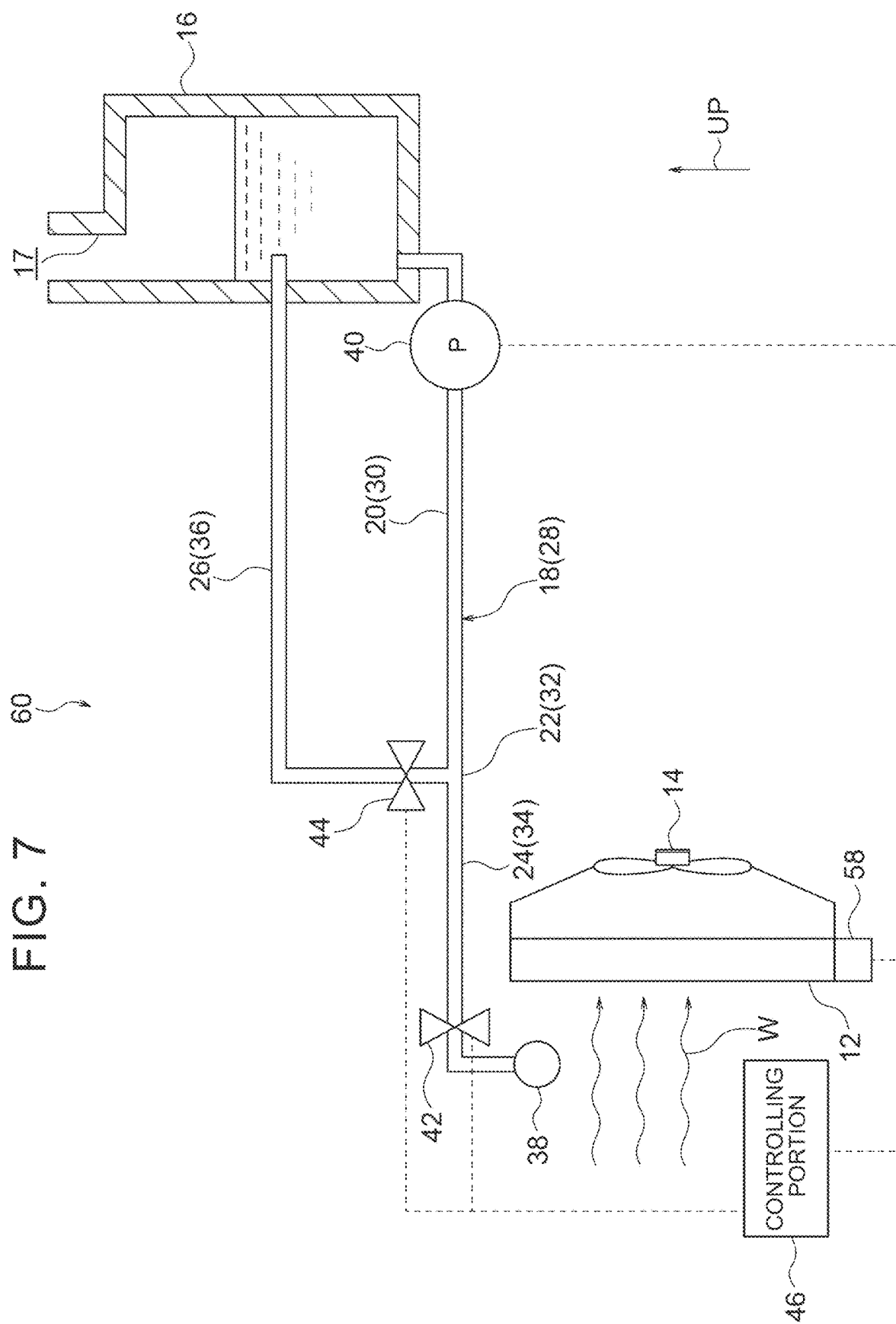
FIG. 7 is a configuration diagram illustrating a second modification of the heat exchanger cooling system according to the embodiment of the present disclosure.

In a second modification 60 illustrated in FIG. 7, the water tank 16 is placed above the base-end side hose portion 20, the branch portion 32, and the first hose portion 24 in the vertical direction. Further, the second hose portion 26 extends upward from the branch portion 32 and turns in the horizontal direction to extend toward the water tank 16 side.

The distal end portion of the second hose portion 26 is inserted into the water tank 16 by penetrating through a side wall of the water tank 16. Hereby, the distal end portion of the second passage 36 communicates with the inside of the water tank 16. Even in the second modification 60, the water flowing into the second passage 36 can be circulated back to the water tank 16. Thus, it is possible to obtain an effect basically the same as that of the above embodiment.

Supplementary Description of Embodiment

In the above embodiment, the second passage 36 (the second hose portion 26) is routed so that the water (liquid) flowing into the second passage 36 is circulated back to the water tank 16 (a storage tank). However, the present disclosure is not limited to this. For example, such a configuration may be employed that a distal end (the distal opening of the second hose portion 26) of the second passage is opened to the atmosphere on the bottom side of a vehicle, that is, the second passage 36 is routed so that liquid flowing into the second passage 36 is discarded (discharged) to a road.

Further, in the above embodiment, the branch portion 32 is placed above the water discharge portion 38 (the liquid discharge portion) in the vertical direction, and the second passage 36 extends upward from the branch portion 32 in the vertical direction. However, the present disclosure is not limited to this. The arrangement and routing path of each component (the branch portion, the first passage, the second passage, and the water discharge portion) of the passage can be changed appropriately.

Further, in the above embodiment, when the controlling portion 46 stops the pump 40, the controlling portion 46 closes the first opening-closing valve 42 and the second opening-closing valve 44. However, the present disclosure is not limited to this. That is, the controlling portion 46 may be configured to stop the pump 40 without closing at least one of the first opening-closing valve 42 and the second opening-closing valve 44.

Further, in the above embodiment, when the controlling portion 46 stops the pump 40, the controlling portion 46 closes the first opening-closing valve 42 prior to the second opening-closing valve 44. However, the present disclosure is not limited to this. For example, the controlling portion 46 may be configured to close the first opening-closing valve 42 and the second opening-closing valve 44 at the same time, when the controlling portion 46 stops the pump 40.

Further, in the above embodiment, the controlling portion 46 activates the pump 40 in a state where the first opening-closing valve 42 is closed and the second opening-closing valve 44 is opened, and after that, the controlling portion 46 opens the first opening-closing valve 42. However, the present disclosure is not limited to this. For example, the controlling portion 46 may be configured to open the first opening-closing valve 42 and the second opening-closing valve 44 at the same time that the controlling portion 46 activates the pump 40.

Further, in the above embodiment, the first opening-closing valve 42 and the second opening-closing valve 44 are so-called ON-OFF valves. However, when the opening degree of at least one of the opening-closing valves 42, 44 is adjustable, the discharge amount of the water from the water discharge portion 38 can be controlled more finely.

Further, in the above embodiment, the radiator 12 is taken as an example of a heat exchanger. However, the present disclosure is not limited to this. Any heat exchanger can be employed, provided that the heat exchanger dissipates, from its outer surface, heat of refrigerant circulating through the heat exchanger.

In addition, the present disclosure can be carried out with various modifications without departing from the gist of the present disclosure. Further, it is needless to say that the scope of the present disclosure is not limited to the above embodiment.

What is claimed is:

1. A heat exchanger cooling system comprising:
    a heat exchanger configured to dissipate heat of refrigerant, wherein the refrigerant is configured to cool a vehicle engine, a battery of a vehicle or a vehicle fuel cell system;
    a storage tank in which liquid is stored;
    a passage extending from the storage tank and branching off into a first passage and a second passage at a branch portion provided in a middle of extension of the passage, the passage including a liquid discharge portion provided on a distal end side of the first passage so as to face the heat exchanger;
    a pump configured to send the liquid into the passage from the storage tank;
    a first opening-closing valve provided in the first passage and configured to open and close the first passage;
    a second opening-closing valve provided in the second passage and configured to open and close the second passage, wherein the second opening-closing valve is a normally-closed type electromagnetic valve; and
    a controlling portion configured to control an operation of the pump and control opening and closing of the first opening-closing valve and the second opening-closing valve, wherein the controlling portion activates the pump in a state where the first opening-closing valve is closed and the second opening-closing valve is opened, and after that, the controlling portion opens the first opening-closing valve.

2. The heat exchanger cooling system according to claim 1, wherein the second passage is routed so that the liquid flowing into the second passage is circulated back into the storage tank.

3. The heat exchanger cooling system according to claim 1, wherein:
    the branch portion is placed above the liquid discharge portion in a vertical direction; and
    the second passage extends upward from the branch portion in the vertical direction.

4. The heat exchanger cooling system according claim 1, wherein, when the controlling portion stops the pump, the controlling portion closes the first opening-closing valve and the second opening-closing valve.

5. The heat exchanger cooling system according to claim 4, wherein, when the controlling portion stops the pump, the controlling portion closes the first opening-closing valve prior to the second opening-closing valve.

6. The heat exchanger cooling system according to claim 1, comprising a temperature sensor configured to detect a temperature of the refrigerant, wherein the controlling portion controls the operation of the pump and the opening and closing of the first opening-closing valve and the second opening-closing valve based on a detection result from the temperature sensor.

7. A heat exchanger cooling system comprising:
    a heat exchanger configured to dissipate heat of refrigerant circulating through a vehicle engine, a battery of a vehicle or a vehicle fuel cell system;
    a storage tank configured to store liquid;

a passage extending from the storage tank and branching off into a first passage and a second passage at a branch portion provided in a middle of extension of the passage, the passage including a liquid discharge portion provided on a distal end side of the first passage so as to face the heat exchanger;

a pump configured to send the liquid into the passage from the storage tank;

a first opening-closing valve connected to the first passage and configured to open and close the first passage;

a second opening-closing valve connected to the second passage and configured to open and close the second passage; and a controlling portion configured to control an operation of the pump and control opening and closing of the first opening-closing valve and opening and closing of the second opening-closing valve, wherein, in response to stopping the pump, the controlling portion is configured to close the first opening-closing valve prior to the second opening-closing valve.

8. The heat exchanger cooling system according to claim 7, wherein the second passage is configured to circulate the liquid back into the storage tank.

9. The heat exchanger cooling system according to claim 7, wherein:

the branch portion is above the liquid discharge portion in a vertical direction; and the second passage extends upward from the branch portion in the vertical direction.

10. The heat exchanger cooling system according to claim 7, wherein the controlling portion is configured to open the first opening-closing valve in response to activating the pump in a state where the first opening-closing valve is closed and the second opening-closing valve is opened.

11. The heat exchanger cooling system according to claim 7, comprising a temperature sensor configured to detect a temperature of the refrigerant.

12. The heat exchanger cooling system according to claim 11, wherein the controlling portion is configured to control the operation of the pump and the opening and closing of the first opening-closing valve and the second opening-closing valve based on a detection result from the temperature sensor.

13. A heat exchanger cooling system comprising:

a heat exchanger configured to dissipate heat of refrigerant circulating through a vehicle engine, a battery of a vehicle or a vehicle fuel cell system;

a storage tank configured to store liquid;

a passage extending from the storage tank and branching off into a first passage and a second passage at a branch portion provided in a middle of extension of the passage, the passage including a liquid discharge portion provided on a distal end side of the first passage so as to face the heat exchanger, wherein the liquid discharge portion is below the storage tank in a vertical direction;

a pump configured to send the liquid into the passage from the storage tank;

a first opening-closing valve connected to the first passage and configured to open and close the first passage;

a second opening-closing valve connected to the second passage and configured to open and close the second passage, wherein each of the first opening-closing valve and the second opening-closing valve is a normally-closed type electromagnetic valve; and a controlling portion configured to control an operation of the pump and control opening and closing of the first opening-closing valve and opening and closing of the second opening-closing valve, wherein, in response to stopping the pump, the controlling portion is configured to close the first opening-closing valve prior to the second opening-closing valve.

14. The heat exchanger cooling system according to claim 13, wherein the second passage is configured to circulate the liquid back into the storage tank.

15. The heat exchanger cooling system according to claim 13, wherein:

the branch portion is above the liquid discharge portion in the vertical direction; and the second passage extends upward from the branch portion in the vertical direction.

16. The heat exchanger cooling system according to claim 13, wherein the controlling portion is configured to open the first opening-closing valve in response to activating the pump in a state where the first opening-closing valve is closed and the second opening-closing valve is opened.

17. The heat exchanger cooling system according to claim 13, comprising a temperature sensor configured to detect a temperature of the refrigerant.

18. The heat exchanger cooling system according to claim 17, wherein the controlling portion is configured to control the operation of the pump and the opening and closing of the first opening-closing valve and the second opening-closing valve based on a detection result from the temperature sensor.

* * * * *